Patented Dec. 26, 1939

2,184,943

UNITED STATES PATENT OFFICE 2,184,943

TREATMENT OF AMMONIACAL SOLUTIONS OF METAL SALTS FOR RECOVERING THEIR CONSTITUENTS

Karl Pattock, Wolfen, Kreis Bitterfeld, and Hans Wassenegger, Dessau in Anhalt, Germany, assignors to I. G. Farbenindustrie Aktiengesellschaft, Frankfort-on-the-Main, Germany No Drawing. Application March 25, 1937, Serial No. 133,000. In Germany April 4, 1936

5 Claims. (Cl. 23—50)

In many commercial processes, for example in the ammoniacal leaching of copper ores, in the production of copper silk or in various electrolytic processes there occur ammoniacal solutions of metal salts which are in part of a very high degree of dilution so that the recovery of metals presents great difficulty.

In the process of this invention such solutions are passed over an exchanger of an acid character comprising waterinsoluble condensation products of a polyhydric phenol with formaldehyde and condensation products of a phenol with formaldehyde, the latter products containing sulfonic acid radicles, which may be introduced before or after the condensation by sulfuric acid or sulfites. The metal in complex solution is absorbed in the form of the metal ammine ion while finally the ammonia passes through the exchanger and either finds application as such or may be absorbed in a second filter.

The invention rests on the observation that when ammoniacal metal salt solutions, for example those of copper, cobalt, nickel, zinc, cadmium, silver and the like, are filtered over these absorbents first metal ammine and free ammonia are simultaneously absorbed. If free ammonia is detectable in the filtrate, the further addition of ammoniacal metal salt solution is continued according to our invention. Under these conditions the free ammonia first absorbed is displaced by further metal ammine and runs off with the filtrate. Finally the metal ammine in the absorbent is partly decomposed under formation of free ammonia and of metal ammine complexes containing less bound ammonia or even metal hydroxide. Thus the concentration of metal in the absorbent becomes essentially higher. This procedure may be exemplified by describing a process for recovering copper from an ammoniacal copper salt solution. If a filter consisting of a granular exchanger of the kind described is loaded with such a solution at the beginning of filtration the exchanger binds copper tetrammine ions as well as free ammonia, but finally it contains practically no free ammonia beyond that which is bound as tetrammine. In the case of salts yielding colored ions, the beginning of the saturation stage of the filter loaded with metal compound is easily recognizable, for instance, by the coloration of a second filter. At this stage the filter content of copper may be further increased by displacement absorption by continuing filtration of the original salt solution.

By the use of a number of filters of the kind described and by suitable replacement of the filters as they become saturated with copper, the whole metal amount of a solution is easily recovered; by regenerating the filters, concentrated copper salt solutions are obtainable. The subsequent regeneration is effected by means of a suitable acid which forms soluble salts of the metal. Its concentration is selected with a view to the intended use of the regenerated solution and is limited apart from the resistance capacity of the filtering material only by the solubility of the metal salt produced. If desired, the ammonia of the metal ammine may be completely or in part thermally removed before the regeneration with acid. If there are several metals in the solution a certain fractionation of the heavy metals may be achieved by displacement absorption salt.

For metallurgical liquors the filtrate obtained after the separation of the heavy metals may be reused directly after making good the loss of ammonia. In the treatment of waste liquor from the copper silk industry it is desirable to recover the ammonia in concentrated form. For this purpose the filtrate freed from metal ammine is passed through further filters from which the ammonia may be recovered by thermal treatment for example a passage of steam, when saturation has been attained.

The following example illustrates the invention, the parts being by weight:

*Example.*—An ammoniacal metal salt solution containing 2 grams of copper, 0.5 gram of zinc, 0.1 gram of cobalt per liter and traces of silver such as is obtained by leaching a burnt copper pyrite, with an aqueous solution containing 1.5 per cent. of ammonia and 1 per cent. of ammonium chloride is clarified and passed through a pair of filters in series which are charged with a resin made by condensation of phenol sulfonic acid with formaldehyde. The liquor is pumped through the filter until a sample of the filtrate from the second filter shows traces of metal when tested with sulfuretted hydrogen. The filtrate after the consumed ammonia has been made good, is again used for leaching fresh quantities of the burnt pyrites. The first of the two filters is then regenerated with hydrochloric acid of 10 per cent. strength and afterwards used as the second filter. The concentrated metal salt solution thus obtained is treated in known manner for recovery of the metals.

Our invention is not limited to the specific details described, for obvious modifications may occur to a person skilled in the art.

What we claim is:

1. The process for recovering metals and ammonia from highly diluted aqueous ammoniacal solutions of complex metal salts which comprises passing the solutions through a number of filters containing a granular waterinsoluble resin of the group consisting of condensation products of a polyhydric phenol and formaldehyde and condensation products of a phenol and formaldehyde, containing sulfonic acid radicles, interrupting the filtration when saturation of the first filter with metal ions occurs, and separating the metal from said filter by regenerating it with an acid which forms soluble salts of the metal.

2. The process for recovering metals and ammonia from highly diluted aqueous ammoniacal solutions of complex metal salts which comprises passing the solutions through a number of filters containing a granular waterinsoluble resin of the group consisting of condensation products of a polyhydric phenol and formaldehyde and condensation products of a phenol and formaldehyde, containing sulfonic acid radicles, interrupting the filtration when saturation of the first filter with metal ions occurs, splitting off the ammonia by a thermal treatment, and separating the metal from said filter by regenerating it with an acid which forms soluble salts of the metal.

3. The process of recovering metals and ammonia from highly diluted aqueous ammoniacal solutions of complex metal salts which comprises passing the solutions through a number of filters containing a granular, waterinsoluble resin of the group consisting of condensation products of a polyhydric phenol and formaldehyde and condensation products of a phenol and formaldehyde, containing sulfonic acid radicles, interrupting the filtration when saturation of the first filter with metal ions occurs, separating the metal from said filter by regenerating it with an acid which forms soluble salts of the metal, and recovering the ammonia from the last filter by a thermal treatment.

4. The process of recovering metals and ammonia from highly diluted aqueous ammoniacal solutions of complex metal salts which comprises passing the solutions through a number of filters containing a granular, waterinsoluble resin made by condensation of phenol sulfonic acid with formaldehyde, interrupting the filtration when saturation of the first filter with metal ion occurs, and separating the metal from said filter by regenerating it with an acid which forms soluble salts of the metal.

5. The process of recovering metals and ammonia from highly diluted aqueous ammoniacal solutions of complex metal salts which comprises passing the solutions through a number of filters containing a granular, waterinsoluble resin made by condensation of phenol sulfonic acid with formaldehyde interrupting the filtration when saturation of the first filter with metal ions occurs, separating the metal from said filter by regenerating it with an acid which forms soluble salts of the metal, and recovering the ammonia from the last filter by a thermal treatment.

KARL PATTOCK.
HANS WASSENEGGER.